BAR-CARRIED DETACHABLE ELECTRICAL TERMINAL BLOCKS

Original Filed Dec. 1, 1958 3 Sheets-Sheet 1

INVENTOR
Lucien Blanchet
By Holcomb, Wetherill & Brisebois
ATTORNEYS

BAR-CARRIED DETACHABLE ELECTRICAL TERMINAL BLOCKS

Original Filed Dec. 1, 1958 3 Sheets-Sheet 2

INVENTOR
Lucien Blanchet
By Holcomb, Wetherill & Brisebois
ATTORNEYS

BAR-CARRIED DETACHABLE ELECTRICAL TERMINAL BLOCKS

Original Filed Dec. 1, 1958 3 Sheets-Sheet 3

INVENTOR
Lucien Blanchet
By Holcombe, Wetherill & Brisebois
ATTORNEYS

United States Patent Office

Re. 25,442
Reissued Sept. 10, 1963

25,442

BAR-CARRIED DETACHABLE ELECTRICAL TERMINAL BLOCKS

Lucien Blanchet, Colombes, France, assignor to Joy Manufacturing Company, Pittsburgh, Pa., a corporation of Pennsylvania Original No. 2,983,897, dated May 9, 1961, Ser. No. 777,328, Dec. 1, 1958. Application for reissue May 24, 1962, Ser. No. 198,420
Claims priority, application France Dec. 11, 1957
18 Claims. (Cl. 339—198)

Matter enclosed in heavy brackets [ ] appears in the original patent but forms no part of this reissue specification; matter printed in italics indicates the additions made by reissue.

It is known that most of the bars adapted for the connection of electric circuits consist of interchangeable terminal-carrier members located adjacent each other and interconnected, for example, by means of threaded rods extending through said terminal-carrier members, and nuts at the ends of said rods.

Electric insulation is generally provided between adjacent terminals so as to prevent any arcing therebetween.

Terminal bars of the aforementioned type have the drawback that when a presumed deficient or otherwise damaged terminal is to be replaced, all the supports must be dismantled to release the support associated with the deficient terminal, or at least, in case of improved assemblies, the terminal to be replaced must be unclamped from the adjacent terminals.

The aim of the applicant is to provide a terminal-carrier member capable of being secured on, or withdrawn from, the assembly means, without displacing the adjacent terminal-supports, the terminal-support being provided with a central terminal embodied by a screw, or if desired by a nut, capable of cooperating with a nut in the former case or with a screw in the latter case, the head of said screw or the said nut being embedded in the plastic material forming the terminal-support, the assembly of both said members being also usable for securing on the terminal-carrier member a connecting metal contact within which cable-end protecting sheaths may be locked by suitable means, whereby the ends of various cables are interconnected by the low electric resistance mass of the metal contact. The width of the terminal-carrier members can in this case be increased, particularly in the case of metal contacts including two or three cables inlets at each end thereof.

Provision has also been made by the applicant for multi-bored assembly devices enabling the carrier-bars to be secured in various ways.

Finally, the protection cover members for all or a part of the terminal carriers of a terminal bar are designed, in accordance with my invention, so as to be mounted in place by a snapping engagement achieved by exerting a simple pressure on locking projections provided, as the case may be, on the terminal carriers or on insulating plates provided between said carriers, the cover-member being to that end suitably recessed or grooved.

The terminal-carrier bar according to my invention is also characterized in that the terminal carriers may be secured at will by a simple snapping thereof, on assembly devices comprising at least one rail-shaped boss, or at least one groove to house such a boss, or on parallel assembly rods, connected by a pair of securing angle-irons, enabling said assembly rods to be maintained in a suitably-spaced relationship.

The terminal carrier bar according to my invention may be further characterized in that it comprises terminal-supports provided with screws supplied with holding grooves for locking washers, said supports having a notched portion permitting the labelling of the circuits connected to various terminals, each cover-member being similarly notched for a second labelling to be effected thereon.

Independently from the intermediate insulating plates enabling the terminal-carriers to be interspaced, when they are not provided with individual covers, provided insulating end-plates are also provided which are adapted to insulate the end-terminals from the metal terminal-clamping members.

The present invention has for its further object to provide an improvement in the embodiment of the metal member embedded in the plastic material forming the terminal-carriers. This improvement comprises boring said metal member head all the way through, said head being adapted to be embedded in said plastic material, said boring being preferably carried out in a direction which will be parallel to the device-assembling rails.

The plastic material extending subsequently into said bore acts as a pin adapted to prevent the embedded member from turning in said plastic, when the end-terminals are subjected to a final clamping in a central terminal type of unit, or, when the metal contacts are being tightened in a contact-equipped type of unit.

It is important for this pin to be very short so as to avoid flexing stresses thereon. That is why it is advantageous to effect the boring in a parallel relationship to the assembling rails of the device, the more so as the relatively thin layer of the plastic material on either side of the embedded member would make it possible for the latter, should said captive member have an unbored head, owing to the very resiliency of the material used, to be subjected to a rotary motion, such rotation being impossible since the plastic material, besides its acting as a pin, also acts as a spacer member to keep an adequate spacing between the two aforementioned thin plastic layers.

A further improvement being the object of the present invention, relates to a braking device for the screw used as a central terminal or as a securing member of a metal contact, in the case the said captive embedded element is a nut. This improvement comprises providing in the plastic material, beneath the embedded nut, a smooth-walled cylindrical recess, having a common axis with said nut and of a diameter substantially equal to the minimum diameter of the threads in the internally threaded bore of said nut, such that upon passing beyond the lower nut level, the clamping screw may act as a tapping or screw threading member for the wall of the aforementioned cylindrical recess.

Other features of the present invention will become clear on reading the following description, with reference to the accompanying drawings, of several embodiments of terminal-carrier bars according to this invention. In these drawings.

Figure 1:
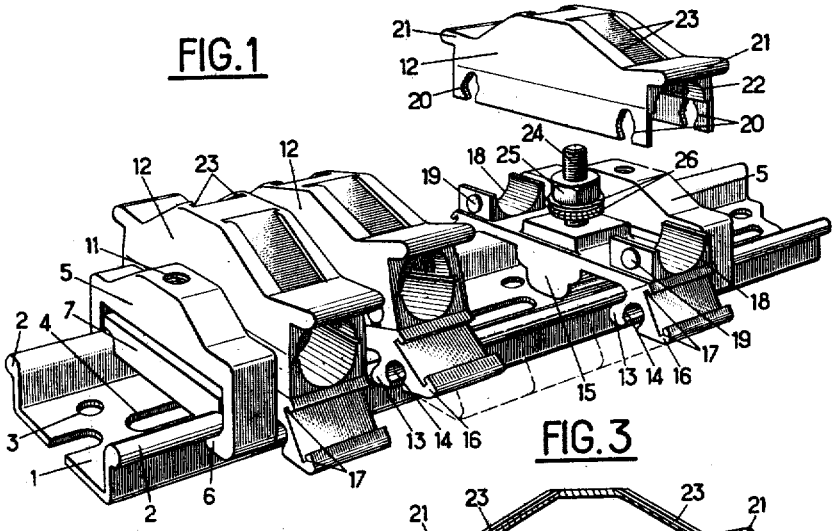
FIG. 1 is a perspective view of a terminal-carrier bar equipped with several terminals juxtaposed on a special assembly device provided with rails, one of the terminals being shown with its cover lifted.

Referring now to FIG. 1, there may be seen the channel member 1 which serves as a support, having at the upper part thereof two flared out portions 2 forming guide rails. This assembling device has a plurality of equidistant holes 3 bored therein, some of which can be seen in FIG. 1. At the symmetrically opposite part of the support, not shown in the drawings, similar holes 3 symmetrical to the former are also provided. The support 1 has also elongated holes or apertures 4 formed therein along the medial axis thereof, the combination of all these holes or apertures permitting various types of mountings.

Figure 2:
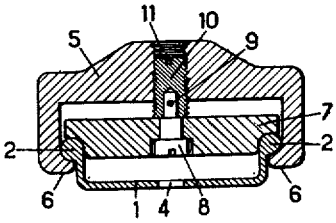
FIG. 2 is a sectional view of one of the terminal-clamping members located at the ends of said bar.

There may be seen in the front part of FIG. 1 and at the left hand thereof, a terminal-clamping member, better seen in FIG. 2, and consisting of a cover-member 5 having at the lower portion thereof two bosses 6 slidable beneath the rails 2 of the assembling device. The terminal-clamping member also includes a stop-member 7 having its edges applied against the upper portion of the rails 2. The unit including the stop-member 7 and the cover 5 is connected together by a piece 8 housed in the stop 7 and made integral, by means of a pin 9, with a screw 10 which may turn in a tapped hole 11 formed centrally in the cover 6. The terminal-clamping members are locked at a predetermined point on the assembling device by turning screw 10, thereby drawing the members 5 and 7 away from each other, thus wedging the bosses 6 against the lower portion of the rails 2 of the assembling device. The terminal adjacent the clamping member is shown with its cover 12 locked on the support. The next terminal is shown in an inclined relationship to the assembling device, so as to show the bosses 13 which, by virtue of the resiliency of the utilized material, enable the terminal-carriers to be secured to the rails 2 of the device, by merely exerting pressure thereon. These supports are moreover recessed as at 14, making possible a similar snapping thereof onto [the] assembly rods *27*, which can be seen in FIG. 4. These recessed portions 14 are downwardly tapered for the wedging therein of said rods. Advantageously, the supports include in the central part thereof a terminal leg, which may also be seen in FIG. 3 and extends downwards to the same level as the lateral portions of the supports. Said terminal leg is formed by a thickened portion of the moulded plastic material, inside of which there may be readily provided the place for an embedded member, which may be a screw 24, or on the *contrary* [contraryt], a nut, having, for example, screwed thereon a screw supplied with holding grooves for locking washers. Such a device, known per se, comprises, as is well-known in the art and shown in FIGURE 3, a threaded portion having an unthreaded groove located beneath it to receive the locking washers therein, the latter being inserted by screwing them on the threaded part of said screw, so that the washers upon the loosening of a connection, remain constantly [integral with] *attached to* the screw used to lock said connection.

The support portions which project laterally away from the recesses 14 are shown at 16 and are formed with longitudinal grooves 17, into which may be inserted locating labels for the circuits. These outstanding portions 16 facilitate the releasing of said terminal supports from rails 2, or from the assembling rods of the device shown in FIG. 4. When examining the terminal support to the right of FIG. 1, there can be seen at the upper portion of said support the rounded recesses 18, through which the cables to be connected to the screws 24 can be passed. The projections 19 provided in this particular embodiment on the support are used for the positioning and locking of the cover members 12, suitably shaped recesses 20 being provided to this end in the covers which also carry ears 21 permitting the cover to be readily freed from said locking projections by virtue of the resilience of the material used. Recesses 22 located under the ears 21 are connected to recesses 18 for the passing of the cable, and notches 23 are provided for labeling covers 12.

Figure 3:
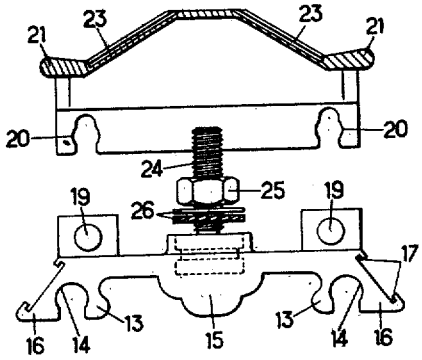
FIG. 3 is a side elevation view of the terminal-carrier of one connection element, having its cover lifted relative to the support and shown in section.

There can also be seen in FIGS. 1 and 3, the embedded screw 24, nut 25 and washers 26.

Figure 4:
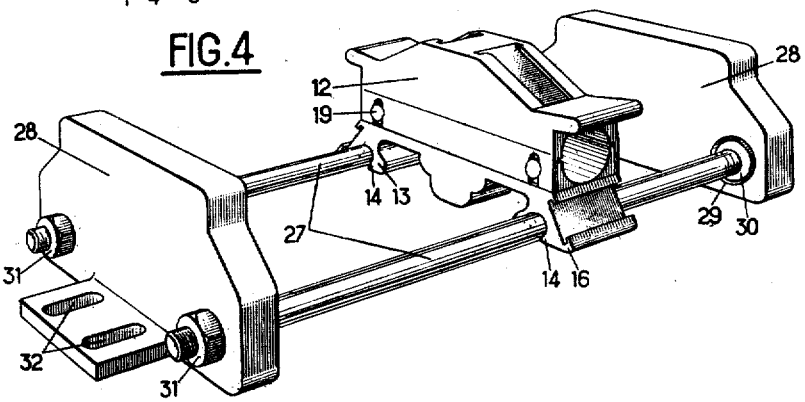
FIG. 4 is a perspective view of a terminal bar comprising connection elements of the same type as in FIG. 1, mounted on a device consisting of assembling rods interconnected by means of two angle-irons.

In the embodiment shown in FIG. 4, the same members are seen with the exception of the device 1, which is in this case replaced by two rods 27, which can, if desired, be formed of a suitable metal without being insulated, by reason of the insulating nature of the terminal supports. It is however common practice to coat these rods, which are threaded by a rolling technique and which are inexpensive, with a flexible insulating sheath, these insulated rods being engaged or housed within the recesses 14 provided in the supports, when the latter are pushed onto these rods.

The device shown in FIG. 4 also comprises a pair of locking angle irons 28 providing recesses 29 to house therein nuts 30, so as to prevent any part projecting inwards from the angle irons which would prevent the supporting devices and the covers thereof from coming into engagement with the lower portion of said angle irons 28. Further nuts 31 outside said angle irons are adapted to lock said irons between the inner and outer nuts at a predetermined spacing relationship therebetween. The angle irons comprise suitable holes as at 32, forming elongated apertures which may be extended to the end of the horizontal angle member, which is assumed to be in the position shown in FIG. 4.

As has already been said, rods 27 are wedged, when the support are positioned, between bosses 13 and the outer portions 16.

Figure 5:
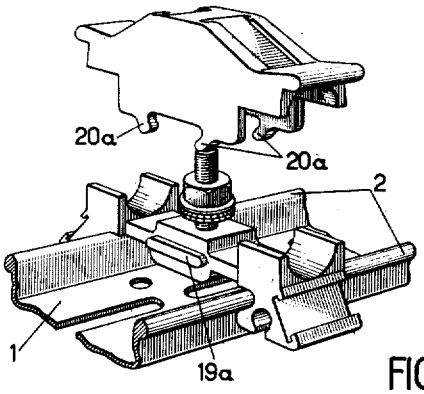
FIG. 5 is a perspective view of an alternative embodiment of the terminal carrier, including an elongated central locking projection adapted to enable an individual cover of an intermediate spacer plate to be secured thereon.

In FIG. 5, both projections 19 in FIG. 1 have been replaced by a centrally arranged projection 19a and the shaped recesses 20 have been replaced by snap fingers 20a.

Figure 6:
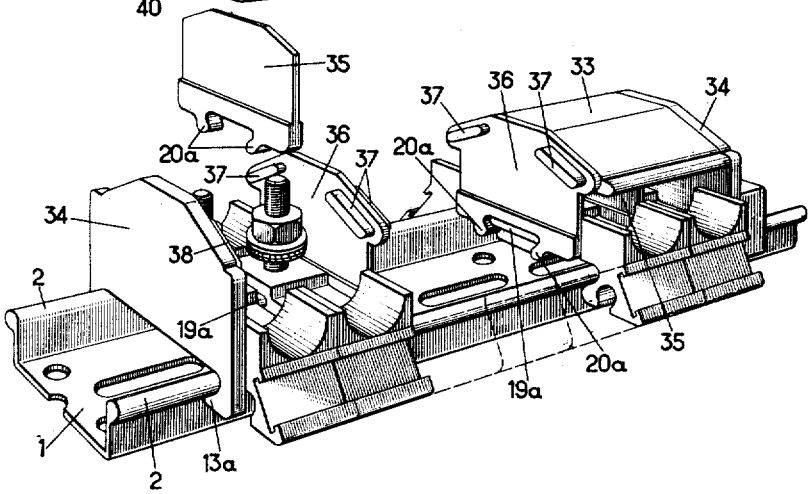
FIG. 6 is a perspective view of a terminal bar showing covers comprising intermediate insulating plates end plates and lids protecting a plurality of the terminal-carriers of one bar.

In FIG. 6 are shown segmental covers comprising lids 33, end-plates 34 and intermediate plates 35 and 36. Plates 35 and 36 are provided with snap fingers 20a exactly identical to those of the individual covers in FIG. 5, thus enabling the terminal supports to be secured on the projections 19a of the terminal supports. Plates 35 are not provided with projections since, as may be seen to the right hand of this FIG. 5, they are merely acting as partitions between two adjacent terminal supports, these plates being moreover of a smaller size than plates 36, since the latter form an end-closure for the segmental covers, while plates 35 have to be housed in the free gap managed between adjacent terminal supports after the positioning of the unitary or segmental lids.

In order to provide for means for attaching said segmental covers, plates 36 carry on both faces thereof projections 37 enabling lids 33 to be secured thereon by a snapping action.

Plates 34 are also provided with projections 38 identical to projections 37. During the mounting of the device, plates 34 are disposed with their projections directed towards the middle portion of the terminal carrier bar, when the end-plates 34 are used in combination with unitary lids, not shown in FIG. 6, and continually extending throughout the length of the terminal carrier bar between both end plates 34. The same is true for the embodiment in FIG. 6, wherein segmental lids 33 are used and are snapped respectively either on the projections carried by the end-plates 34 or on those of the partition plates 36.

Conversely, it is sometimes advantageous to use end-plates, even when individual lids are utilized, thus improving the insulation relative to the terminal clamping members. In this latter case, the plates 34 are arranged with their projections directed outwardly, so as not to interfere with the positioning of the individual covers of the outermost terminal-carriers.

It may also be seen in FIG. 6 that plates 34 are snapped onto the rails 2 of the assembling devices and comprise to this end snapping fingers 13a comparable to those provided on the terminal-carriers.

Lids 33, as well as the unitary lids, provide for the protection of a whole terminal carrier-bar and they are produced by extrusion, being advantageously grooved as at 39 for the labeling of the lid, which may be made of transparent material for this purpose, and provided with tangs 40, which can be snapped on the projections 37 and 38 of the plates 34 or 36.

Figure 7:
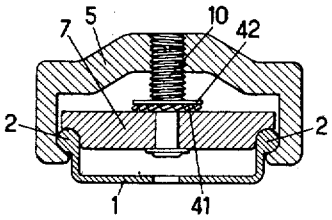
FIG. 7 is a sectional view of the terminal-clamping member similar to that of FIG. 2, wherein the clamping screw comprises at the base thereof two pressure washers, one of which is fanned.

The fanned washer 41 and the flat washer 42 are shown in FIG. 7, they prevent any loosening of the screw 10 due to vibrations and, consequently, any displacement of the cover 5 and of the member 7 relative to the rails 2.

Figure 8:
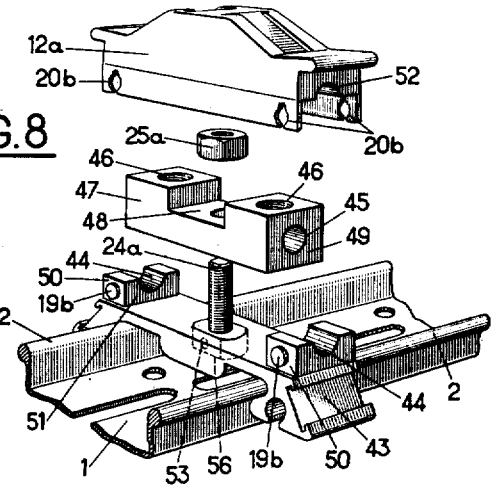
FIG. 8 is an exploded perspective view of a terminal-carrier having an individual cover, mounted on the assembling rails of a terminal bar and adapted to receive a metal contact for the connection of two cables thereto.

The carrier 43 for the metal contact 47, shown in FIG. 8, differs only from the terminal-carrier in FIG. 1, by the reduced thickness of the plastic material used thereon, and by a correlative decrease of the diameters of said recesses owing to the fact that they are adapted to house cables not provided with a bored end terminal but cables simply end-protected by a copper sheathing. This copper sheath is then inserted into bores 45 provided in the metal contact, tapped holes 46 enabling these sheaths to be immobilized by means of suitably shaped screws.

The contact 47, which can be seen in FIG. 8, is recessed at 48 to house the locking nut 25a adapted to tighten the contact on the screw 24a. The two front faces of the contact 47, one of which can be seen in FIG. 8 and is indicated by the numeral 49, engage upon being mounted the two inner faces of two salient portions 50 carrying the projections 19b. One of said inner faces 51 corresponding to the front face of the contact opposite to the face 49, can also be seen in FIG. 8.

Owing to the length of the metal contact, the thickness of the salient portions 50 is smaller than in the embodiment of FIG. 1, projections 19b, and the recesses 20b formed in the individual cover are then spaced to a greater extent than in FIG. 1. The cover can also include snapping fingers 20a, as does the cover in FIG. 5, said fingers cooperating with a centrally located projection 19a of the terminal carrier.

Cable-inlet recesses 52 are likewise of the same diameter as the recesses 44, i.e. a smaller diameter than that of recesses 22 of the embodiment shown in FIG. 1.

Figure 9:
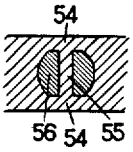
FIG. 9 is a horizontal sectional view of the terminal-carrier, taken at the level of the embedded member half-length, showing the metal and the plastic portions, respectively.

It can be seen in FIGS. 8 and 9 that the screw 24a, having its substantially cylindrical head embedded in the plastic material forming the support of the contact 43, comprises two flats slightly reducing its overall size lengthwise of the terminal carrier bar, leaving on either side of the embedded screw an adequate insulating layer.

A bore 53 is provided lengthwise of the terminal carrier bar for the earlier stated reasons, i.e. to prevent a resilient deformation of the portions 54, seen in FIG. 9 and interconnected by a small cylindrical pin 55 made of plastic engaged into the bore 53 of the embedded pin 56 and forming the head of the screw 24a.

Figure 10:
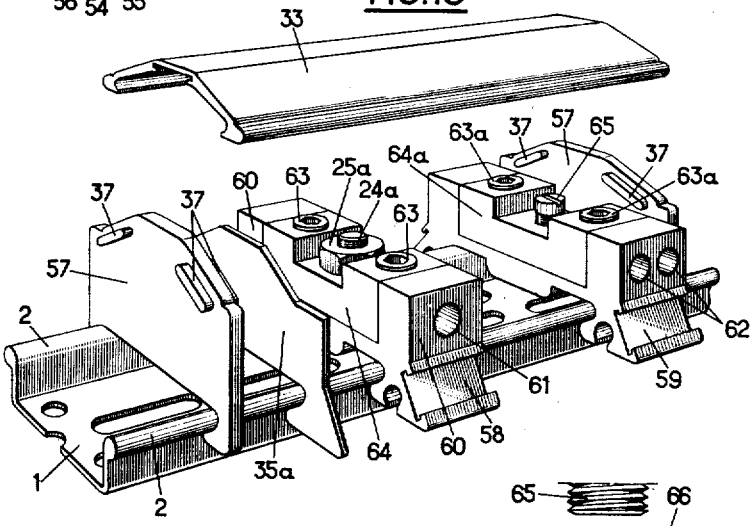
FIG. 10 is a perspective view of a terminal-carrier bar including two contact-supports of different types.

In the embodiment of FIG. 10, the metal contact carriers are adapted to be used in conjunction with a unitary lid 33 of a type similar to that of FIG. 6. There may also be seen in this FIG. 10, an intermediate plate 57 snapping onto the assembling rails 2 in the same manner as the end-plates 34 in FIG. 6. This plate 57 comprises four projections 37 similar to those provided on the intermediate plates 36 in FIG. 6, and used to insure snapping of the lid 33 onto said rails.

The metal contact carriers 58 and 59 are of a different type from that of the carrier 43, although the metal contacts employed are of a similar design, since the covers 33 would not have provided an adequate lateral protection in respect to the insulation thereof, if they were used in conjunction with supports of the type of the support 43 in FIG. 8. The support or carrier visible on the left-hand side of this figure has at either end thereof projecting portions 60 of the same height as the faces 49 of the contacts, so as to provide an insulation all around the cable which extends first through the horizontal bore 61 provided in the support 58, before extending into the bore 45 of the metal contact member.

The contact carrier 59 is of a different type, having lengthwise of the terminal carrier bar a greater thickness, two adjacent cables to be connected on either side of the contact support. These cables extend through the bores 62 of the terminal carrier and to the metal contact, which also has two adjacent bores (not shown), a single tightening screw 63a being provided at each end of the metal contact to simultaneously effect the tightening or clamping of both cables extending through adjacent bores of the metal contact.

Moreover, the support 59 has been devised with the contact 64a being secured by means of a screw 65 cooperating with a nut 66 embedded in the supporting plastic material.

Figure 11:
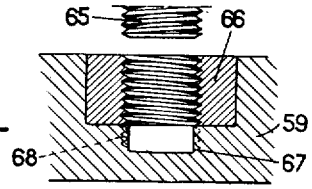
FIG. 11 is a vertical sectional view of the metal contact securing device, showing a smooth-walled recess provided beneath an embedded nut and adapted to brake the screw.

It will be noted that it is advantageous in this type of installation to provide in the plastic material, beneath the lower level of the nut 66, a cylindrical smooth-walled recess 67 seen in FIG. 11. This cylindrical recess is of a diameter substantially equal to the thread bottom or root diameter of the screw 65 cooperating with the nut 66, said recess having a common axis with said nut. A braking action on the screw is thus provided from the moment it gets beyond the lower level of said nut.

The tapping section thus achieved in the plastic material by virtue of the advancement of the screw 65 therethrough has been shown in broken lines at 68.

Once the lids 33 have been snapped onto the projections 37, they extend to the upper portion of the terminal-supports, this preventing any risk of an untimely extraneous contact with any of the contact members.

The insulation between the various cables is, on the other hand, provided by means of the plates 35a located between adjacent contacts and differing from plates 35 of FIGURE 6 only in that their snapping engagement, which can be seen in FIG. 10, is effected on the assembling rails rather than on a central projection of the terminal carrier, exactly like the snapping of the plate 57.

It is to be noted that the respective locations of said projections and the snapping fingers and tongues can be modified, with the possibility of reversing the respective positions of the two cooperating snapping elements.

It will be obvious to those skilled in the art that various alterations, improvements and additions can be made in the described embodiments, namely by the substitution of equivalent means, without falling outside the scope and the spirit of this invention, as defined in the appended claims.

What I claim is:

1. A terminal-carrier bar for the connection of electric cables comprising an elongated support member made of rigid material, at least one terminal support member extending transversely thereacross and made of a comparatively resilient insulating material, the adjacent surfaces of said elongated and terminal support members being formed into elongated interfitting snap attaching means, one of which may be snapped into the other when the material of said terminal support yields under pressure, the attaching means on said elongated support member extending longitudinally thereof and the attaching means on said terminal support member extending transversely of said terminal support member, at least one metal terminal on each terminal support member, the lower portion of which is embedded in said insulating material, and cover means of resilient insulating material, said cover means being formed with integral snap attaching means mating with interfitting snap attaching means on the assembly comprising said support members, said snap attaching means being separable by deformation in a direction transverse to the longitudinal axis of said elongated support member and the sides of said terminal support members being free of any other attaching means.

2. A terminal-carrier bar as defined in claim 1, wherein the lower portion of the metal terminal which is embedded in the insulating material forming the terminal supports, is bored through in a direction parallel to the assembling rails or rods of said bar, the thus obtained bore being filled with insulating material.

3. A terminal-carrier bar as defined in claim 1, wherein the central metal terminal consists of a nut embedded in said insulating material, the upper face of which is at the same level that the upper face of the terminal-support, and a screw adapted to cooperate with said nut, and in which a smooth-walled cylindrical recess, having a common axis with said nut and a diameter substantially equal to the diameter of the bottom or root of the thread of the screw cooperating with said nut, is provided in the insulating material forming the terminal support beneath said nut.

4. A terminal-carrier bar as defined in claim 1, wherein at least one of the terminal supports carries a metal contact member fitted into a recess in said terminal support and in electrical contact with said terminal, said metal contact member being adapted to be used with a cable-connection employing screw-locking means.

5. A terminal-carrier bar as defined in claim 1, wherein the terminal-supports are provided with at least two locking projections adapted to cooperate by snapping with at least two recesses provided in said cover means.

6. A terminal-carrier bar as defined in claim 5, wherein said cover means comprise individual cover-members which have projecting portions facilitating their positioning or withdrawal, and include cable-inlet recesses of a semi-circular section, registering with symmetrically disposed recesses of the terminal-supports.

7. A terminal-carrier bar as defined in claim 1, wherein said cover means further comprises: intermediate insulating plates between adjacent terminal-supports, molded of the same insulating material as the terminal-supports; metal clamping members on the ends of said elongated [suport] *support* member, end-plates between outermost terminal-supports and said metal terminal-clamping members, also molded of the same insulating material as the terminal-supports and adapted to cooperate by snapping with said elongated support member, said intermediate and end-plates being provided with locking projections; and shaped lids for the protection of the whole or a part of the terminal-supports on said bar, including longitudinal tongues adapted to cooperate by snapping with said locking projections on the end-plates and on some of the intermediate plates, the lower portion of said lids registering with the upper portion of the terminal-supports, thus providing a complete outer insulation for the central terminal and of bared cable portions.

8. A terminal-carrier bar as defined in claim 7, wherein said terminal support members carry additional snap attaching means and said intermediate insulating plates are shaped to interfit therewith by snapping.

9. A terminal-carrier bar as defined in claim 7, wherein said intermediate insulating plates are shaped to cooperate by snapping with said elongated support member.

10. A terminal-carrier bar as defined in claim 1, wherein at least one terminal consists of a screw supplied with a holding groove for locking washers, said screw cooperating with a nut embedded in the insulating material forming the terminal-support.

11. A terminal carrier bar as claimed in claim 1 in which said elongated support member is channel shaped and said interfitting snap attaching means are formed on the edges of the side walls thereof.

12. A terminal carrier as claimed in claim 1 in which [said interfitting] *the* snap attaching means *which mate with those on said cover means* are positioned on the sides of said terminal support member.

*13. A terminal carrier bar for the connection of electrical conductors comprising an elongated rigid support having a pair of parallel laterally spaced abutments extending longitudinally thereof, at least one elongated terminal support made of a comparatively resilient plastic insulating material extending transversely across said rigid support, each terminal support comprising a body portion, at least one metallic terminal supported thereby, and a pair of spaced resilient abutments in the form of legs projecting in the same direction therefrom and extending transversely with respect thereto, one of said pairs of spaced abutments being dimensioned to be resiliently retained between the other pair of spaced abutments and forming therewith interfitting snap-attaching means for attaching said terminal support to said elongated rigid support.*

*14. A terminal carrier bar as claimed in claim 13 in which said other pair of spaced abutments are the abutments of said terminal support.*

*15. A terminal carrier bar as claimed in claim 13, in which said snap attaching means permit said terminal support to slide along said elongated rigid support when attached thereto.*

*16. A terminal carrier bar as claimed in claim 13 in which one end of said terminal is embedded in and locked against rotation with respect to said terminal support member.*

*17. A terminal carrier bar for the connecting of electrical conductors comprising an elongated support member made of a rigid material, a plurality of terminal support members made of a resilient plastic insulating material mounted side by side on said elongated support member and extending transversely thereacross, said terminal support members being individually slidable with respect to one another in a direction transverse with respect to said elongated support so that individual terminal supports may be individually unsnapped from said longitudinal support may be individually adjacent terminal supports, said elongated and terminal support members having adjacent surfaces formed into interfitting snap attaching means such that when the material of said terminal support yields under pressure said terminal support member snaps onto said elongated support member and electrical terminals carried by said terminal supports respectively.*

*18. A terminal carrier bar as claimed in claim 17, in which said terminal support members are longitudinally slidable on said elongated support.*

References Cited in the file of this patent or the original patent

UNITED STATES PATENTS

| | | |
|---|---|---|
| 1,926,927 | Woertz | Sept. 12, 1933 |
| 1,936,963 | Dutzmann | Nov. 28, 1933 |
| 2,683,506 | Immel et al. | July 13, 1954 |
| 2,780,791 | Morschel | Feb. 5, 1957 |
| 2,830,281 | Robb | Apr. 8, 1958 |
| 2,892,176 | Gordon | June 23, 1959 |

FOREIGN PATENTS

| | | |
|---|---|---|
| 554,853 | Italy | Jan. 16, 1957 |
| 716,623 | Germany | Jan. 24, 1942 |
| 1,039,430 | France | May 13, 1953 |